Nov. 30, 1943.  J. VITALE  2,335,712

TURRET FOR ENGINE LATHES

Filed Oct. 19, 1942  2 Sheets-Sheet 1

INVENTOR.
Joseph Vitale

BY
ATTORNEY

Nov. 30, 1943.   J. VITALE   2,335,712
TURRET FOR ENGINE LATHES
Filed Oct. 19, 1942    2 Sheets-Sheet 2

INVENTOR.
Joseph Vitale
BY
ATTORNEY

Patented Nov. 30, 1943

2,335,712

UNITED STATES PATENT OFFICE 2,335,712

TURRET FOR ENGINE LATHES

Joseph Vitale, Brooklyn, N. Y.

Application October 19, 1942, Serial No. 462,456

2 Claims. (Cl. 29—48)

This invention relates to new and useful improvements in a turret for engine lathes.

More particularly, the invention contemplates the construction of an engine lathe turret which is characterized by a tool holding turret body of any number of sides, such as four sides, eight sides, etc., and novel means for holding said turret in various turned positions.

More particularly, the invention proposes to characterize the holding means by a pin projecting from the top of a holding member and selectively engageable in one of a plurality of complementary openings formed in the tool holding turret body.

Still further the invention proposes the provision of a tongue projecting from the turret body and engageable selectively with vertical grooves formed in the holding member.

The invention further proposes the provision of a spring for lifting the turret body to separate it from the holding member. A clamp handle is also proposed for clamping the turret body down.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
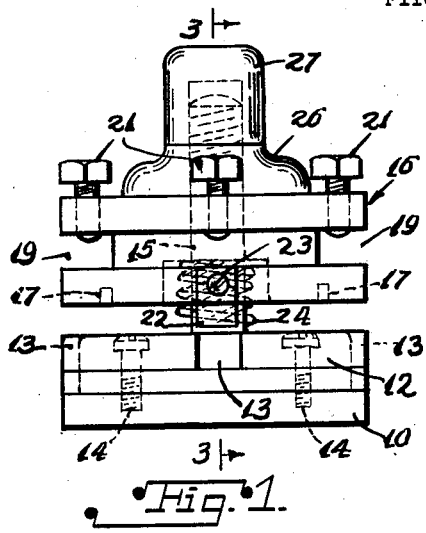
Fig. 1 is a side elevational view of a lathe turret embodying this invention.

The engine lathe turret, in accordance with this invention, includes a bottom lock plate 10 for engaging in the cross feed ways of a lathe. A holding member 12 is attached on the lock plate 11 and is formed with vertical grooves 13 on its sides. Screws 14 are used for attaching the holding member 12 to the lock plate 10. A threaded stud 15 is vertically mounted on the holding member 10 centrally thereof. A hardened pin 14' projects from the top of the holding member 12. A tool holding turret body 16 is turnably mounted on the stud 15 and on its bottom face is provided with niches 17 into which the said pin 14' may selectively engage.

Figure 2:
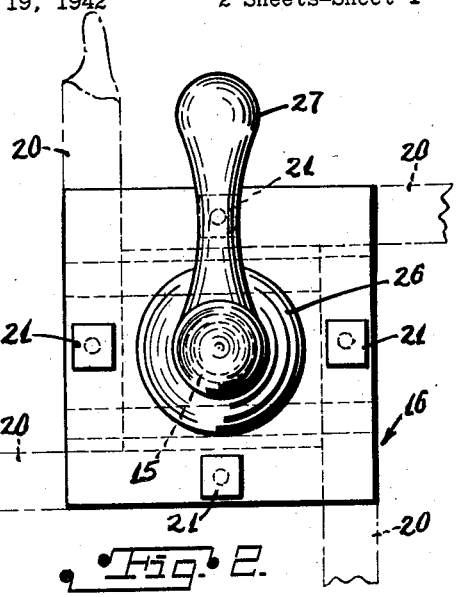
Fig. 2 is a plan view of Fig. 1.
Figure 4:
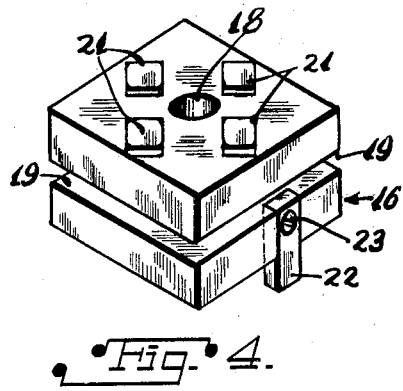
Fig. 4 is a perspective view of the tool holding turret body, per se.
Figure 3:
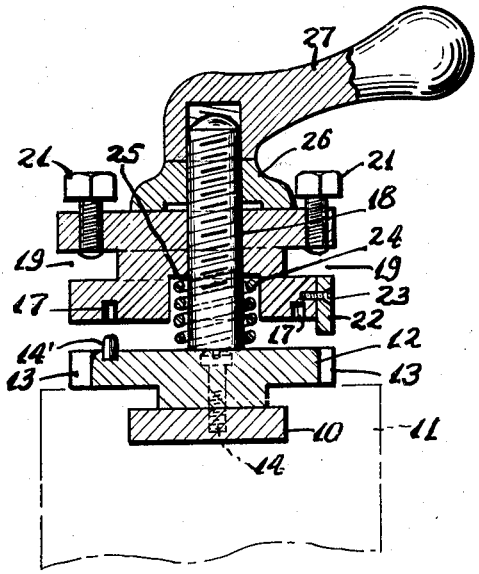
Fig. 3 is a vertical sectional view taken on the line 3—3 of Fig. 1.
Figure 5:
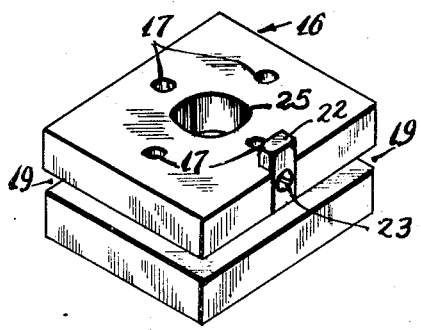
Fig. 5 is a perspective view of the bottom of Fig. 4.
Figure 6:
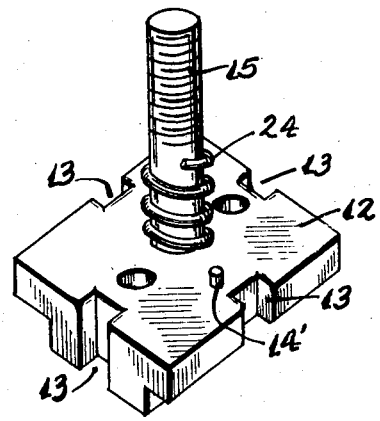
Fig. 6 is a perspective view of the holding member of the lathe turret.
Figure 7:
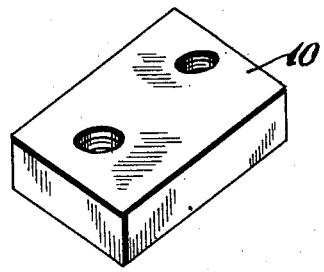
Fig. 7 is a perspective view of the bottom lock plate of the lathe turret.

More particularly, the tool holding turret body 16 is formed with a central opening 18 through which the stud 15 loosely engages so that the turret body may turn. A tool receiving slot 19 is cut around the sides of the turret body 16. This slot may be of any width to receive cutting tools, schematically indicated by the reference numeral 20 in Fig. 2. Clamp screws 21 threadedly engage through portions of the turret body 16 and are adapted to engage the cutting tools to firmly hold them in position.

A tongue 22 preferably tool steel, projects from the turret body 16 and is engageable selectively with any one of the said vertical grooves 13. This tongue is in the form of a short bar of material secured on the side of the turret body by a screw 23. A spring 24 is coaxially mounted on the stud 15 and engages into a recess 25 in the bottom face of the body 16. This spring urges the turret body upwards. A washer 26 is engaged over the stud 15 and rests against the top of the body 16. A clamp handle 27 is threadedly engaged with the stud 15 and engages the washer 26 and is for the purpose of clamping the turret body 16 down.

The operation of the lathe turret is as follows:

The various cutting tools 20 may be mounted on the turret body 16 and securely held by the clamping screws 21. The turret body 16 may be turned by loosening the clamp handle 27. The spring 24 then lifts the turret body 16, disengaging the pin 14' from one of the openings 17 and also disengaging the tongue 22 from one of the grooves 13. The turret body 16 may now be turned to a new position. The handle 27 is then screwed down, and first the tongue 22 is engaged in the top of one of the grooves 13 and then this guides the engagement of the pin 14' in one of the openings 17. The handle 27 is then tightly screwed down.

Figure 8:
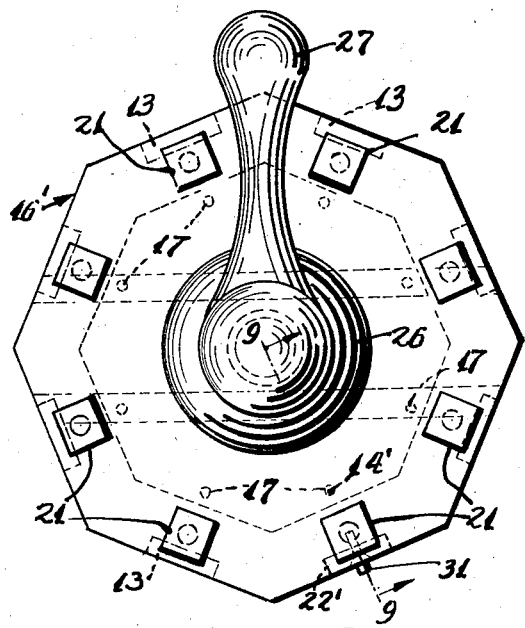
Fig. 8 is a plan view of a lathe turret constructed in accordance with a modified form of the invention.
Figure 9:
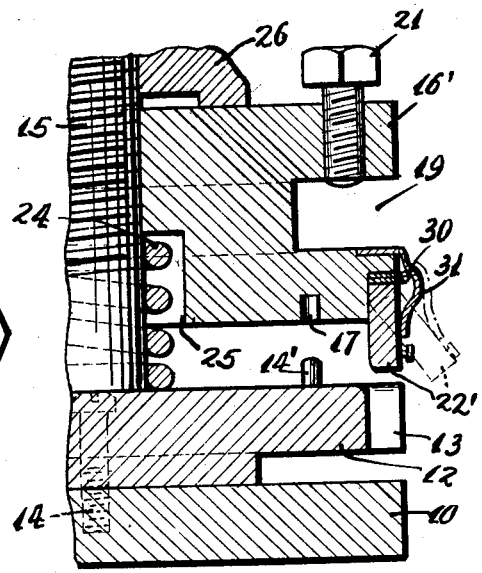
Fig. 9 is a sectional view taken on the line 9—9 of Fig. 8.

The lathe turret 16 is shown to have four sides, but this is only by way of illustration. It may be provided with any number of sides. In Figs. 8 and 9 a modified form of the invention is disclosed in which a lathe turret and body 16' is used having eight sides. This turret body 16' is provided with a tongue 22' which is hingedly mounted on the turret body 16' by a hinge 30.

The construction is such that the tongue 22' may be pivoted outwards, as indicated in the dot and dash lines 22'. A spring 31 normally urges the tongue 22' inwards. In other respects this form of the invention is similar to the previous form and like parts are identified by like reference numerals.

The operation of this form of the invention is substantially identical to the prior form, except that the tongue 22' may be manually lifted laterally as permitted by its hinge 30 to be moved free from or to be engaged with one of the grooves 13. This initially guides the turret body 16' downwards and subsequently the projecting pin 14' engages a complementary opening 17. In other respects the operation is identical.

It is to be understood that in this turret device, four, eight or any other number of tools may be used.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An engine lathe turret, comprising a bottom lock plate for engaging in the cross feed ways of a lathe, a holding member mounted on said lock plate and having vertical grooves in its sides, a pin extending upwards from said member, a tool holding turret body turnably and vertically slidably supported on said holding member and having niches in its bottom face with which said pin may be selectively engaged for holding said turret body against turning when said turret body is urged downwards onto said holding member, means for urging said turret body downwards, a tongue projecting from said turret body and selectively engageable with one of said grooves in said holding member for assisting said pin in holding said turret body against turning when urged downwards, said tongue having its top end pivotally attached to said turret body so that its bottom end may be moved radially outwards clear of the groove it engages, and resilient means urging said tongue into a position in which it engages said groove.

2. An engine lathe turret, comprising a bottom lock plate for engaging in the cross feed ways of a lathe, a holding member mounted on said lock plate and having vertical grooves in its sides, a pin extending upwards from said member, a tool holding turret body turnably and vertically slidably supported on said holding member and having niches in its bottom face with which said pin may be selectively engaged for holding said turret body against turning when said turret body is urged downwards onto said holding member, means for urging said turret body downwards, a tongue projecting from said turret body and selectively engageable with one of said grooves in said holding member for assisting said pin in holding said turret body against turning when urged downwards, said tongue having its top end pivotally attached to said turret body so that its bottom end may be moved radially outwards clear of the groove it engages, and resilient means urging said tongue into a position in which it engages said groove, comprising a leaf spring having one end attached to said turret body above said tongue and it other end depended downwards and bearing against said tongue.

JOSEPH VITALE.